United States Patent [19]

Touchton et al.

[11] 4,321,517
[45] Mar. 23, 1982

[54] RESONANCE SUPPRESSION METHOD

[75] Inventors: James J. Touchton, Boulder; John P. Hill, Broomfield, both of Colo.

[73] Assignee: Storage Technology Corporation, Louisville, Colo.

[21] Appl. No.: 99,988

[22] Filed: Dec. 3, 1979

[51] Int. Cl.$^3$ .............................................. G05B 5/01
[52] U.S. Cl. .................................. 318/618; 318/616; 360/78; 324/162; 324/177
[58] Field of Search ............... 318/561, 616, 617, 618; 324/177, 162; 360/78

[56] References Cited

U.S. PATENT DOCUMENTS

| | | | |
|---|---|---|---|
| 3,568,059 | 3/1971 | Sordello | 324/177 |
| 3,820,712 | 6/1974 | Oswald | 318/618 |
| 3,883,894 | 5/1975 | Johnson | 324/177 |
| 4,200,827 | 4/1980 | Oswald | 318/616 |
| 4,246,536 | 1/1981 | Bradley et al. | 324/177 |

*Primary Examiner*—David Smith, Jr.
*Assistant Examiner*—Eugene S. Indyk

*Attorney, Agent, or Firm*—Woodcock, Washburn, Kurtz, Mackiewicz & Norris

[57] ABSTRACT

A method of suppressing resonances in electromechanical servo systems is disclosed. The servo systems are of the type where first signals indicative of actual position of the servo system are differentiated and second signals indicative of the acceleration of the system are integrated. The differentiated signals are applied to the integrator in order to provide accurate initialization thereof. In modes of operation where the acceleration of the system is substantially zero, the differentiators are not used, thus decoupling the mechanical system from the electronic control system and eliminating resonance from the servo loop. The duty cycle of the differentiators is varied in differing modes of operation of the servo system so as to provide maximum bandwidth and speed to the system coupled with minimum errors in positioning. The system is described in connection with the servoing of magnetic read/write heads radially with respect to rotating magnetic disk data storage media.

13 Claims, 9 Drawing Figures

(→ INDICATES DIRECTION OF INCREASE AS DISTANCE TO DESTINATION DECREASES)

RESONANCE SUPPRESSION METHOD

BACKGROUND OF THE INVENTION

This invention relates to electronic means for controlling mechanical resonances in closed loop servo systems. In particular, the invention is described with reference to a servo system used to drive magnetic read-write heads radially with respect to rotatable magnetic disk storage media, and comprises a method whereby mechanical resonances occurring in the servo drive system can be prevented from causing instabilities in the servo loop leading to inaccuracies and/or loss of speed of response of the servo system.

It is presently common practice in the data processing industry to store large quantities of magnetic data in digital form upon rotating disk storage media, i.e. magnetic disks. Such disks are of numerous types; the present invention pertains to rigid (i.e. non-floppy) magnetic disks, a plurality of which are stacked atop one another on a common shaft and rotated at a steady speed. Magnetic read/write heads, one for each side of each disk, are moved in and out radially with respect to the disks in response to machine commands. All the magnetic heads are mounted on a single head drive means and moved together, until the head is positioned at the distance from the center of the disk where the particular record sought to be read or written is located. Clearly it is desirable to provide a magnetic storage media with as much data storage capacity as possible. To this end, naturally it is desirable to locate the tracks as close to one another as possible. The drive means used to move the magnetic heads radially with respect to the disks must be correspondingly accurate, regardless of the type of drive chosen. The usual drive choice is a servo system in which a motor is used to drive the magnetic head mounting structure back and forth with respect to the disk and in which position signals relative to the actual position of the heads are generated by a moving position sensing head interacting with permanently coded position information on the disk itself, so as to provide an accurate position sensing means. The information gained from this position sensing head is then used to generate a desired position command, used to control the future action of the motor moving the magnetic heads radially with respect to the disk. Such a "feedback" servo system is well known in the art. However, the high performance requirements of modern data storage media pose considerable difficulty. It is desirable to treat magnetic disk storage media as "random access memory"—that is, memory which may be non-sequentially accessed—which requires that the access time of the magnetic disk storage media be as short as possible. If this facility is to be economic with today's high speed computers, the servo system must be increasingly accurate and fast. This in turn leads to difficulties with mechanical resonances in the servo system, including the heads themselves. In order that the data may be packed densely on the magnetic disk, it is necessary that the heads "fly" on the magnetic surface on an air bearing on the order of several millionths of an inch thick. Clearly, only a minor resonance is required to destroy such a delicate air bearing and it is therefore essential that mechanical resonances be avoided completely. A further criterion which must be considered in detail by the designer of the servo system is accurate position sensing of the heads relative to the disks so that the data can be reproducibly read or written onto specific areas of each individual disk. Numerous systems have been proposed in the prior art for generating accurate position sensing information, see, e.g., U.S. Pat. No. 3,820,712 to Oswald for "Electronic Tachometer" which is in some ways similar to the system employed by the present invention and upon which the present invention may be to some extent construed as an improvement. See also U.S. Pat. Nos. 3,568,059 to Sordello for "Electronic Tachometer" and 3,833,894 to Johnson for "Disk Drive Servo System" which are somewhat less relevant approaches to similar problems.

All three of the systems described in the patents mentioned above operate using the same source of position signals. One of the plurality of magnetic disks mounted on the central spindle for rotation is provided with regularly spaced magnetic codes which can be detected by a magnetic head and counted in order to provide accurate position sensing information. The signal generated by this head is essentially a sine wave as the head is moved towards a new position during a "seek" operation (hereinafter sometimes a "seek"). Such a sine wave signal is useful for counting the intervals between such permanently coded magnetic bands but in itself is not suitable for controlling a servo motor, as the sine wave is non-linear at positions not near its nulls (i.e., near the 90° and 270° peaks of the signals) which tends to cause difficulty of control. To avoid this problem, the prior art as exemplified by the Oswald patent referred to above indicates that a control system may operate part of the time on a signal produced by differention of the sine wave produced by the magnetic position sensing head and the remainder of the time on a signal derived from the current drawn by the servo motor as it moves during a seek. This motor current signal may be integrated to give a signal proportional to the velocity of the servo system and thus an indication, over time, of the position of the servo-controlled apparatus. However it will be understood that a velocity signal derived from motor current will ignore certain variables which tend to influence velocity, such as windage, bearing wear and the like and that therefore an actual position sensing signal is needed to accurately control the motion of the servo driven apparatus. In the Oswald scheme, as mentioned above, the integrated velocity signal is used as the primary control but is updated periodically by replacing the initial conditions used in the integrating process by position signals derived from the magnetic position sensing means. In a preferred embodiment, according to Oswald, the position information (i.e. the initial conditions of the integration) is updated every 180° of the sine wave signal, at 30° before and after the nulls of the sine wave, i.e. when the amplitude of the wave is at half its maximum value. This approach is used in the present application under certain circumstances to be detailed more fully below.

Thus, while the combination of the differentiated position signal and the integrated current or velocity signal according to Oswald yields accurate velocity sensing, Oswald does not solve the problem of mechanical resonance. In a typical disk drive system, the servo is first directed to accelerate the apparatus being driven to a given velocity, then to hold that velocity until the desired point of reading or writing is approached, and finally to decelerate the apparatus as quickly as possible until the desired point is finally reached, when the servo is directed to halt the apparatus. It has been found that mechanical resonances in the system during the steady velocity phase of the seek are aggravated by any instabilities in the servo control loop and, as mentioned above, these mechanical resonances are most damaging to the system performance. In the prior art, therefore, the mechanical resonance problem has been overcome by limiting the bandwidth of the servo loop, essentially lowering the magnitude of the resonant peak in the mechanical resonance system below unity gain so that the servo loop would not resonate in "tune" with the mechanical system. The difficulty with this approach is that the loss of bandwidth in the servo loop causes a larger error in the output—that is, erratic arrivals of the magnetic read/write head and therefore a loss of reliability. Alternatively, reliability can be increased by slowing down the overall motion of the servo system, but of course that is not desirable either.

OBJECTS OF THE INVENTION

It is therefore a primary object of the invention to provide an improved servo system.

A second object of the invention is to provide an improved servo system for driving magnetic read/write heads radially with respect to rotating magnetic disk medium.

A third object of the invention is to provide a magnetic servo system for magnetic storage disk drive systems which does not suffer from instabilities in its control loop.

Still another object of the invention is to provide closed loop stability in a system without sacrificing servo system bandwidth and thereby limiting performance.

Still a further object of the invention is to provide a servo system for driving magnetic read/write heads with respect to magnetic storage media which provides increased performance in terms of arrival reliability without suffering a loss of access time or from damaging mechanical resonances.

SUMMARY OF THE INVENTION

The above objects of the invention and needs of the art are achieved by the present invention by reconfiguring the structure of the servo loop such that during certain phases of operation the loop is stable due to the absence of the mechanically resonant system from the servo loop. This reconfiguring of the loop may be performed by well known switching means. The duty cycle of the loop reconfiguration is varied dependent upon the mode of operation of the servo system and is varied during parts of the overall seek operation. In a particularly preferred embodiment, the position sensing information is not differentiated to provide a velocity signal during the steady velocity mode. Instead the velocity signal is generated solely by integration of motor current, which is sufficiently accurate for proper position arrival but does not involve mechanical resonance since the motor current is not part of the resonant system which includes the position-sensing magnetic head. Differentiation is performed during the decelerate portion of the seek at a low duty cycle, sufficient to provide fully accurate position sensing without resonance, and the duty cycle is gradually increased during the final stages of deceleration to provide accurate high speed stopping at the desired position of the magnetic heads with respect to the disk storage media.

BRIEF DESCRIPTION OF THE DRAWINGS

The invention will be better understood if reference is made to the accompanying drawings in which.

DESCRIPTION OF THE PREFERRED EMBODIMENT

Figure 1:
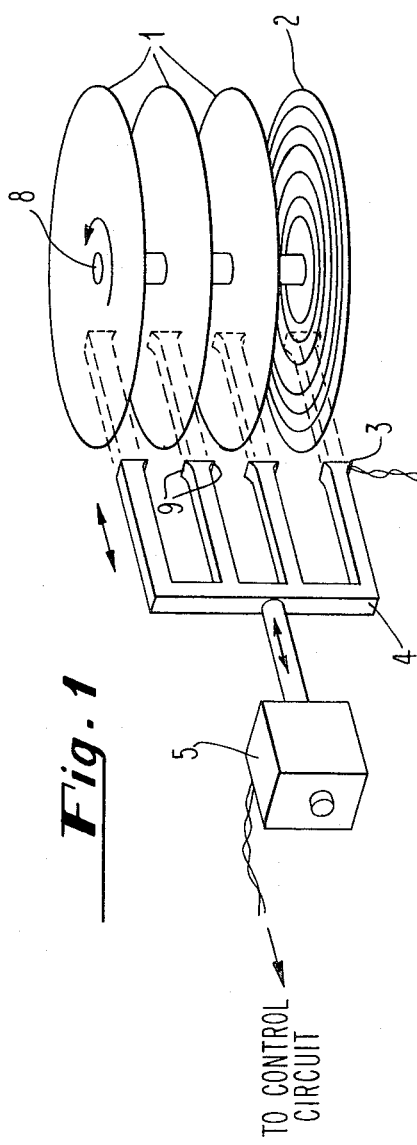
FIG. 1 represents a schematic view of a servo system driven magnetic read/write head assembly showing the motion of the assembly relative to a plurality of magnetic disks.

As discussed above, in electro-mechanical servo systems, the gain bandwidth of the system is usually limited by the mechanical resonance of the system which in turn limits the accuracy and reliability of the system. The velocity servo on magnetic disk media contains an electronic tachometer which derives its velocity signal from position and motor current by periodically switching between the differentiation of position and the integration of motor current. The differentiation provides the initial conditions for the integrator and the integrator provides velocity information during the non-linear portion of the position transducer signal. The mode of velocity generation switching at approximate 50% duty cycle—i.e., when the sine wave position signal reaches half its maximum amplitude—synchronized to the position transducer period has been a common practice in the prior art. According to the present invention, the duty cycle of the tachometer is varied as a function of the portion of the seek the system is controlling. During the acceleration portion of the seek, for example, the velocity loop is open due to the fact that finite power is supplied to accelerate the carriage assembly to the required velocity. Mechanical resonances do not affect the stability of the loop since the loop is open. Therefore, the velocity signal can be generated as in the prior art and at a continuous 50% duty cycle. However, after the required velocity is achieved, the velocity loop is then commanded to maintain a constant velocity. At this point, the prior art tachometer continues at a 50% duty cycle. According to the present invention, however, the tachometer is switched at this point to a total integration of motor current using the last differentiation of position as the intial condition, i.e. a 0% duty cycle of differentiation. This total integration of motor current removes the effects of the mechanical resonances from the loop by closing the loop around motor current. In this mode, motor current is approximately zero since only such minor effects as windage need be compensated for instead of, e.g., acceleration, as before. Therefore the amount of velocity error caused by external forces is negligible and no differentiation is required to provide an accurate velocity signal.

After the velocity has been held steady for a predetermined time chosen by control apparatus not forming a part of the present invention, the deceleration portion of the seek is entered and the differentiator is used at a low duty cycle to correct the integrator. This low duty cycle prevents the mechanical resonances in the system from affecting the stability of the velocity loop. As the remaining distance to the desired destination is reduced, so of course is the velocity command, gradually slowing the servo apparatus down. This requires that the duty cycle of the differentiator be gradually increased to increase the accuracy of the velocity signal to insure accurate arrival. This modification of duty cycle can be implemented in either a discrete or a continuous manner. This method of resonance suppression allows one to operate reliably with more loop gain, i.e. higher speed, without being affected by mechanical resonances. In turn, this allows one to operate more reliably with a larger range of mechanical tolerances as well as lowering the cost of assembly of the overall system. Suppression of the resonance in the velocity loop, besides providing stability in the axis of displacement, also prevents vertical mode resonances of the system from being excited due to the cross-coupling of the energy.

Referring now to FIG. 1, a schematic view of a magnetic data storage system according to the invention is shown. A plurality of magnetic disks 1 are shown as mounted on a single spindle rotated in common along with a disk 2 which provides position sensing information. This sensing information, which may simply comprise a circular magnetic track, is picked up by a magnetic head 3 mounted for radial movement on a servo assembly 4. The servo assembly 4 is driven back and forth by a servo motor 5 with respect to the disks 1 and 2. As shown in FIG. 1, the servo motor in the preferred embodiment is a voice-coil motor and moves the head assembly back and forth but it will be understood, of course, that any sort of motor could be used; in a preferred embodiment, a linear motor is used according to the teachings of the prior art.

Also mounted on the servo-controlled carriage 4 are a plurality of magnetic read/write heads 9 which are adapted, as is known in the prior art, to detect data written onto the disks 1 or to write similar data onto the disks when commanded to do so by means not within the scope of the present invention. The magnetic heads move back and forth with respect to the spindle 8 on which the disks 1 are mounted in order to access substantially their entire surface area. Clearly, the more accurately the servo motor 5 can control the position of the magnetic heads 9, the more information can be written on each of the disks 1 which has obvious economic and access-time advantages.

The effect of resonance in this system can be summarized as follows. If there is an increase in the amount of current drawn by the motor 5, the servo read head 3 would tend to be forced further from the surface of the servo disk 2 due to the cross coupling of energy. This would cause a decrease to appear in the position data signal, which in turn would tend to decrease the differentiated position signal (velocity). With a fixed velocity command, the loop would respond to this apparent decrease in velocity with a further increase in motor current, which would aggravate the effect. In this way the loop can be made unstable.

The velocity servo system according to the invention is a typical servo system in which velocity is the command. The function of the servo loop is to force the carriage assembly to move at the commanded velocity. A block diagram of such a loop appears as FIG. 2. The loop of FIG. 2 operates as follows. The requested velocity command, shown arriving at the left of the drawing from control means (not shown) is a voltage proportional to a chosen velocity. This command is compared to the measured velocity at a summation node 10. A velocity error signal is produced at the node 10 which is proportional to the difference between the requested velocity and the measured velocity, i.e. the two voltages may be compared by a difference amplifier circuit. The error signal is passed to the controller 11 which modifies the magnitude and phase of the velocity error as a function of frequency. A low pass filter is known in the art to provide this function. The main function of the controller 11 is to provide stability, at the expense of bandwidth. The signal passes from the controller 11 to a power amplifier 12 which converts this small voltage to a large current capable of driving the servo motor 5 and hence the carriage 4. The current, multiplied by a predetermined force constant 13 is then integrated in integrator 14 to provide a signal proportional to velocity according to Newton's laws. The output of this loop is therefore carriage velocity which appears at the right side of the loop shown in FIG. 2. The second integration of the velocity signal in integrator 15 gives a signal indicative of carriage position again according to Newton's laws. This signal may be converted to a voltage proportional to position at the position transducer 16 which signal, along with a voltage proportional to the motor current may be processed by a tachometer 17 to produce a voltage accurately proportional to velocity, which is then returned to the summing node 10, to begin the loop again as described above. The tachometer 17 is discussed in further detail in connection with FIG. 4 below.

Figure 3:
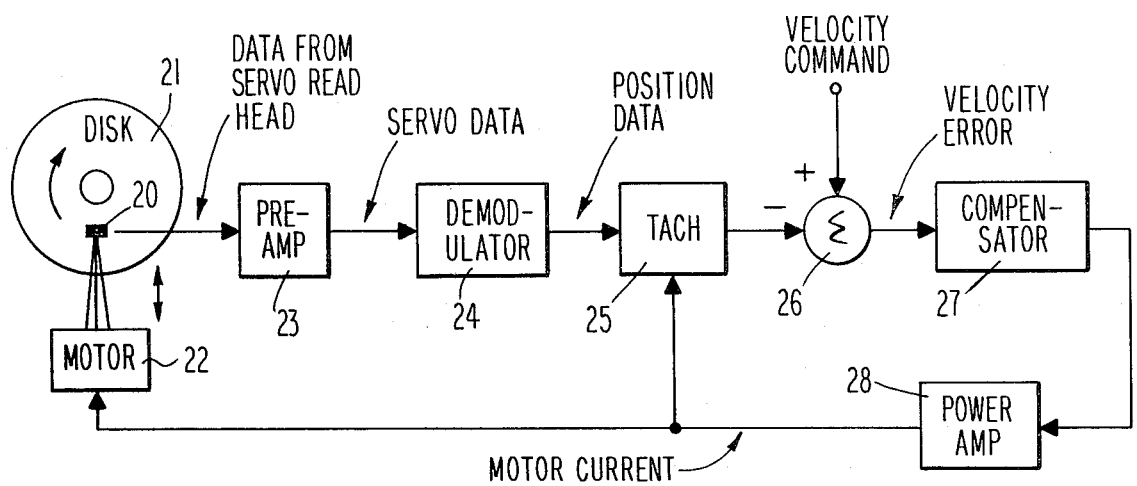
FIG. 3 shows a second schematic diagram of the velocity servo loop according to the invention.

Referring now to FIG. 3, a slightly different embodiment of the invention is shown therein. Position data, comprising a coded wave form as is known by the art, which may approximate a sine wave, is fed from a sensor 20 mounted for movement radial to a rotating magnetic disk 21 under the influence of a servo motor 22, to a preamplifier 23. After having been amplified, this servo data is then passed to a demodulator 24 for conversion into a voltage representing position data thence to a tachometer 25 described below in connection with FIG. 4. The output signal of the tachometer 25 is sent to a summing node or difference amplifier 26 where it is compared with a velocity command from control means not forming a part of the present invention. The output of the difference amplifier 26, the velocity error signal, is passed through a compensator 27 which directs a power amplifier 28 to drive the motor 22; clearly if the velocity error is positive, for example, the amplifier 28 will provide more power to the motor 22 causing the motor 22 to accelerate the sensor 20 with respect to the disk 21. Motor current signal or a signal proportional thereto is also passed to the tachometer 25 for processing together with the next received position data.

Figure 4:
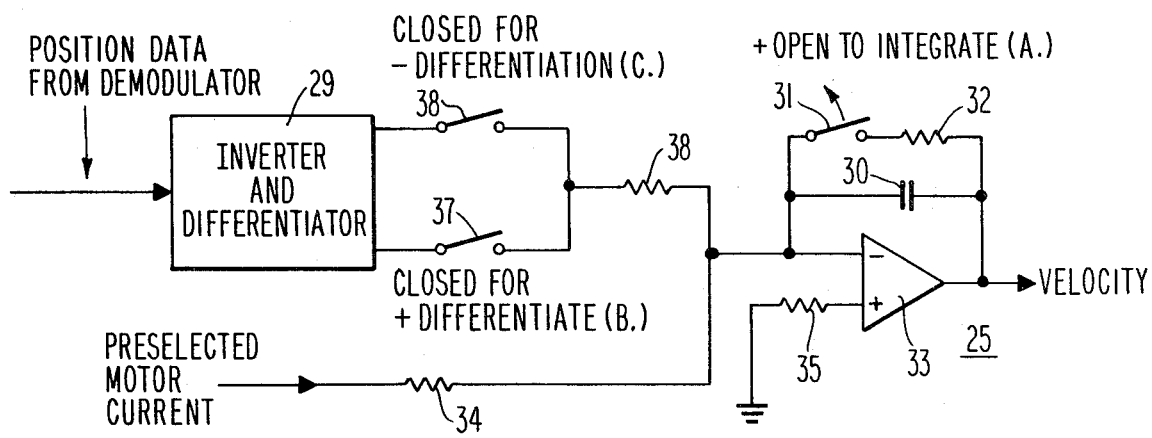
FIG. 4 shows the tachometer circuit.

Referring now to FIG. 4, a schematic diagram of the tachometer circuit according to the invention is shown. This circuit is comparable to that shown in the patent to Oswald referred to above, in that it provides an integrating capacitor 30 on which a voltage proportional to the integral of the motor current is stored. Integration may be interrupted by a switch 31, operating in conjunction with a resistor 32 which causes the integrator to become an amplifier. It will be understood that the capacitor 30, resistor 32 and switch 31 comprise amplifier and integrator means by virtue of their being connected in the feedback loop of an op amp 33, which integrates the motor current signal arriving through resistor 34. Resistor 35 references the amplifier to ground as is well known to the art. The output of this tachometer is a signal representative of velocity, as shown. Additional switches 36 and 37 are provided in order to compensate for the positive- and negative-going differentiation signals derived from the position data by the inverter and differentiator 29 to provide accurate initialization of integrator capacitor 30. It will be understood that the derivative of the sinusoidal signal output by the demodulator 24 goes first positive and then negative while the actual physical representation of the velocity is, of course, always positive; therefore, one of the two is inverted in inverter and differentiator 29 so as to provide non-phase sensitive amplification in the op amp 33.

It will be also understood that the switches 31, 36, and 37 can be any one of a variety of solid state or other switching means such as field effect transistors and may be readily controlled by timing and switching means known in the art. The switches 36, 37, and 31 can desirably be controlled in response to the output of a threshold detector arranged to detect when the sinusoidal signal from the demodulator has reached a preset point by comparison with a reference voltage, indicating, for example that the sine wave has passed half its maximum amplitude thus indicating that is 30° from a null. By varying the threshold height, the duty cycle of the differentiator can be varied. As discussed below, the operation of the switches 31, 36, and 37 is used to provide the variation in duty cycle of the differentiator essential to the invention. The selected motor current is a signal proportional to motor current such that an increase in motor current causes an increase in velocity independent or carriage velocity direction.

Figure 2:
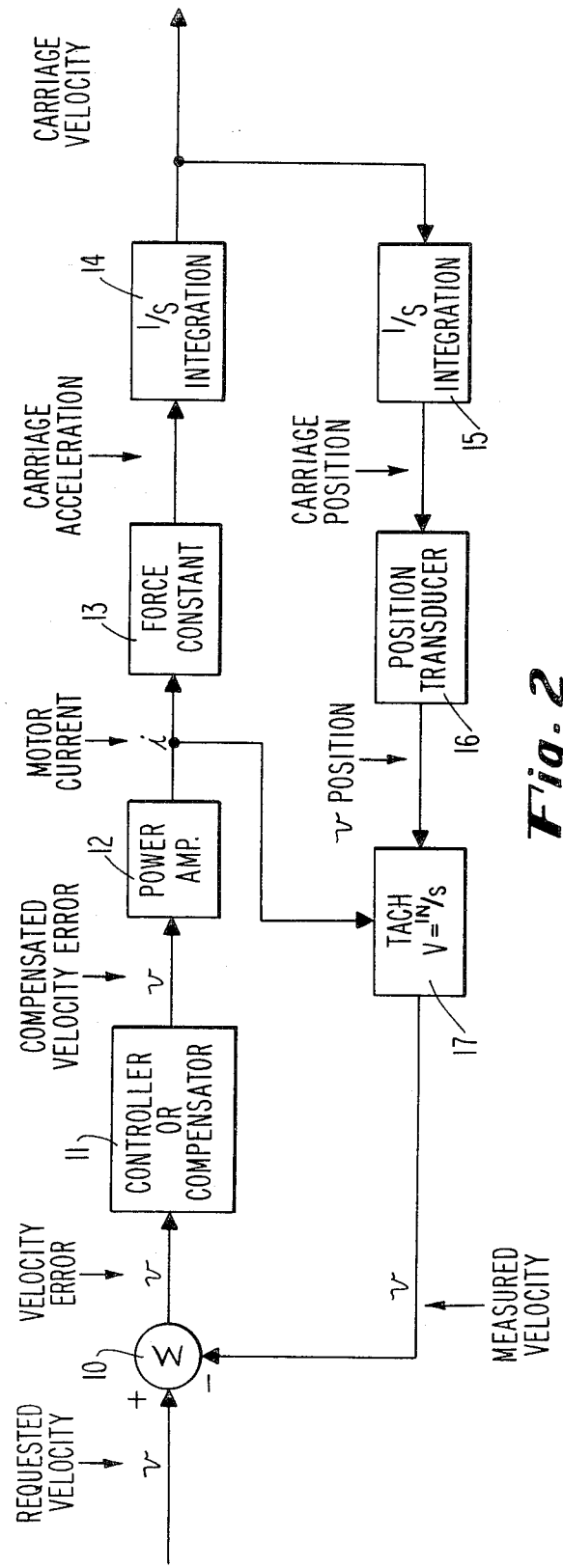
FIG. 2 represents a block diagram of servo system control apparatus according to the invention.
Figure 5:
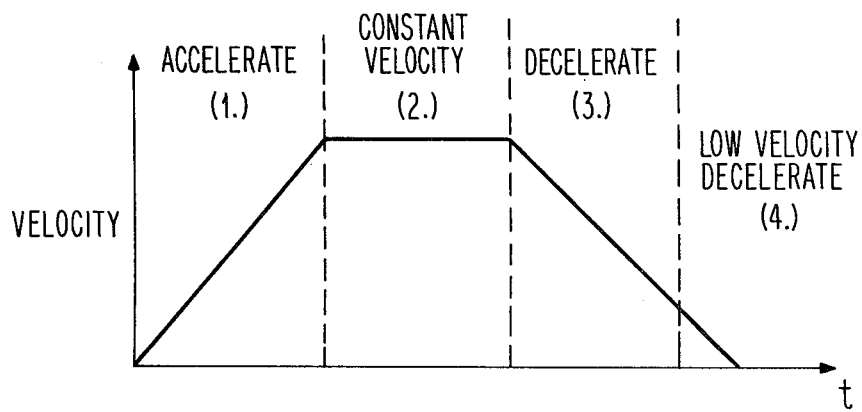
FIG. 5 shows the variation in velocity during the seek operation.

Referring now to FIG. 5, a schematic plot of the velocity of the servo motor with respect to time is shown. Given that the servo means has been directed to seek a particular track, the digital information used by the disk drive controller to indicate the distance to be traversed by the head is converted into an analog voltage. This voltage then becomes a reference or command voltage which is compared with the actual voltage in a summing node 26 (FIG. 3) or 10 (FIG. 2). In either case, the servo motor is first directed to accelerate at a fixed, maximum rate indicated as mode 1 of FIG. 5. It is then held at a constant velocity in mode 2, and when at a predetermined distance from the track sought the deceleration mode 3 is begun. Finally, when the velocity is near zero, a low velocity decelerate mode 4 is entered.

Figure 6:
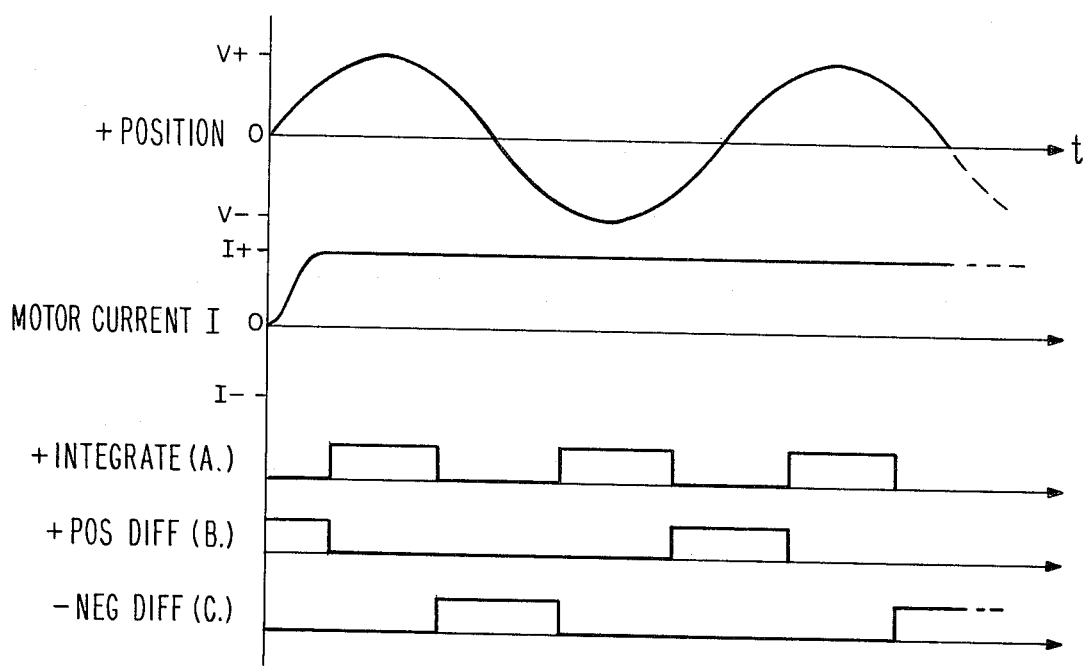
FIG. 6 shows relevant wave forms and timing diagrams during the accelerative mode of the seek operation.

FIGS. 6–9 are comparable wave form and timing diagrams which correspond to the four modes of control of the velocity of the servo motor shown in FIG. 5. FIG. 6 refers to mode 1, the accelerative mode. There is shown in FIG. 6 a first wave form, an essentially sine wave of gradually shortening period as one looks from left to right in the diagram, indicating the output of the demodulator 24 of FIG. 3. Clearly, as the servo motor accelerates the nulls and peaks of the sine wave output by the modulator 24 become closer and closer together. Next, moving down FIG. 6, the motor current I is shown as constant in the accelerative mode; therefore the acceleration (FIG. 5) is substantially constant throughout the mode. The next diagrams in FIG. 6, labeled "integrate", "positive differentiation" and "negative differentiation" are timing diagrams showing the operation of the tachometer in the integration and differentiation modes. Integration of motor current is performed, in accordance with timing diagram A, during the non-linear portions of the sine wave. During the more linear portions of the sine wave, that is near its approaches from and departures from nulls, the sine wave may be conveniently differentiated to provide a signal indicative of velocity as indicated by timing diagrams B and C. The positive differentiation B and the negative differentiation C alternate, of course, with the integrating portions of the wave form A, at which time the signals are applied to the op amp 33 of FIG. 4. It will be observed and understood by those skilled in the art that switch 31 is opened during the high parts of timing diagram A, that switch 36 is closed during the high parts of timing diagram C and that switch 37 is closed during the high parts of timing diagram B. In this way, the integrator may be reset twice per period of the sine wave with accurate initial conditions for integration. Thus, a velocity signal is constantly available to the summing node for comparison with the command voltage and control of the current sent to the motor by the power amplifier. During the acceleration portion of the seek, maximum power I is being applied to linear motor; since this power is, of course, finite the loop can be considered open at this time so there is no question of instability.

Figure 7:
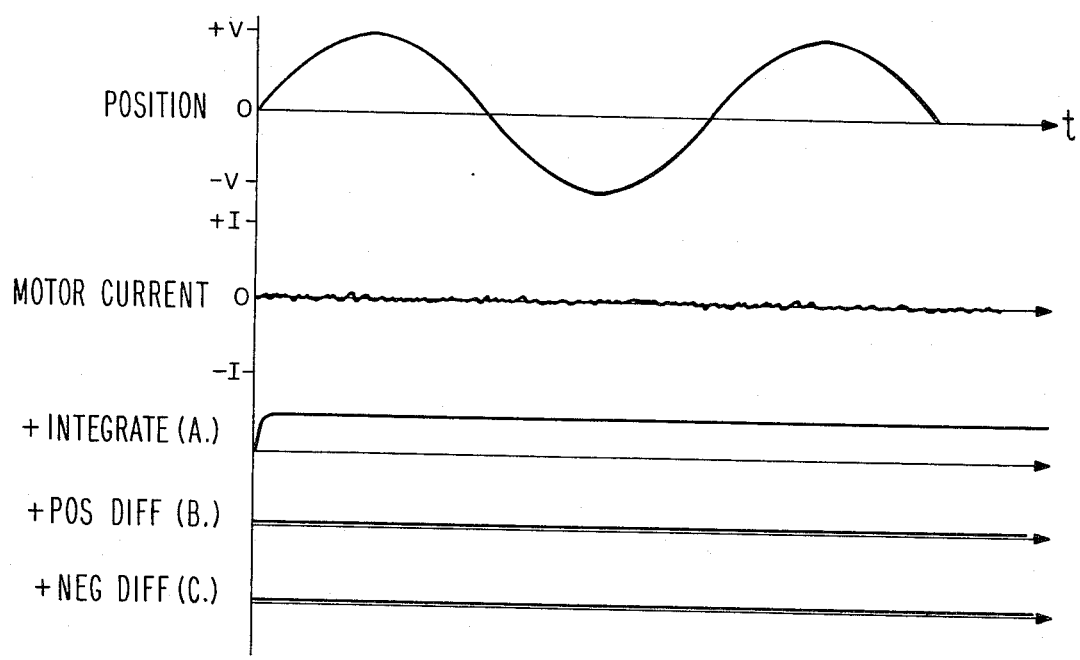
FIG. 7 shows similar wave forms and timing diagrams during the constant velocity part of the seek operation.

By comparison, in the constant velocity phase 2, (FIG. 7), the velocity command is constant so the motor current is very small, current only being required to overcome windage and the like; therefore, the loop is susceptible to instability at this time. For this reason, mechanical resonance is removed from the loop by turning both differentiators off, as shown in FIG. 7, while the integrator stays on continually. Integration can be performed continually without loss of the proper velocity signal since any fluctuation from a constant motor current will tend to average out over time. Therefore, there is no need for continuous position sensing by means of the differentiators. Thus, during the constant velocity portion of the seek, the velocity signal is generated totally from the integration of motor current which removes the mechanical resonances from the servo loop since they are only picked up by the sensor 20 operating directly off the position information on the disk 21 (FIG. 3).

Figure 8:
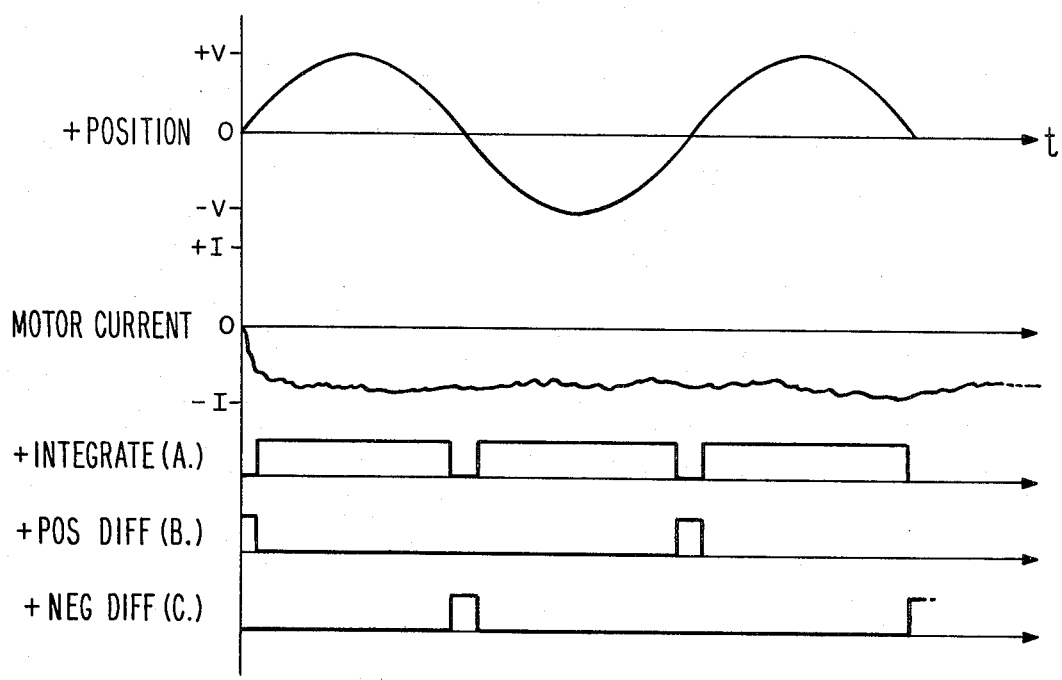
FIG. 8 shows comparable wave forms and timing diagrams during the decelerative portion of the seek operation.

In the decelerate mode, the velocity loop is susceptible to instability due to mechanical resonance, since the actual position sensing device must be put back into the loop to provide stopping of the servo motor at the proper place. The velocity command required is, for obvious reasons, a function of the remaining distance to the destination, so it is continually being diminished. For this reason, FIG. 8 shows that the differentiators are introduced during the decelerate portion of the seek at a low duty cycle, sufficient to correct the integrator but not long enough to support any instabilities which might be generated. Therefore, in FIG. 8 the sine wave's period gradually increases, while the motor current remains at a substantially consistent low level, the integrator is on most of the time and the positive and negative differentiators are introduced only at a low duty cycle sufficient to correct the conditions of integration. If, as discussed above, the duty cycle of the differentiators is controlled by a threshold detector, the threshold is set low—at between about 5 and about 30% of the maximum amplitude of the sine wave—during the decelerative mode.

Figure 9:
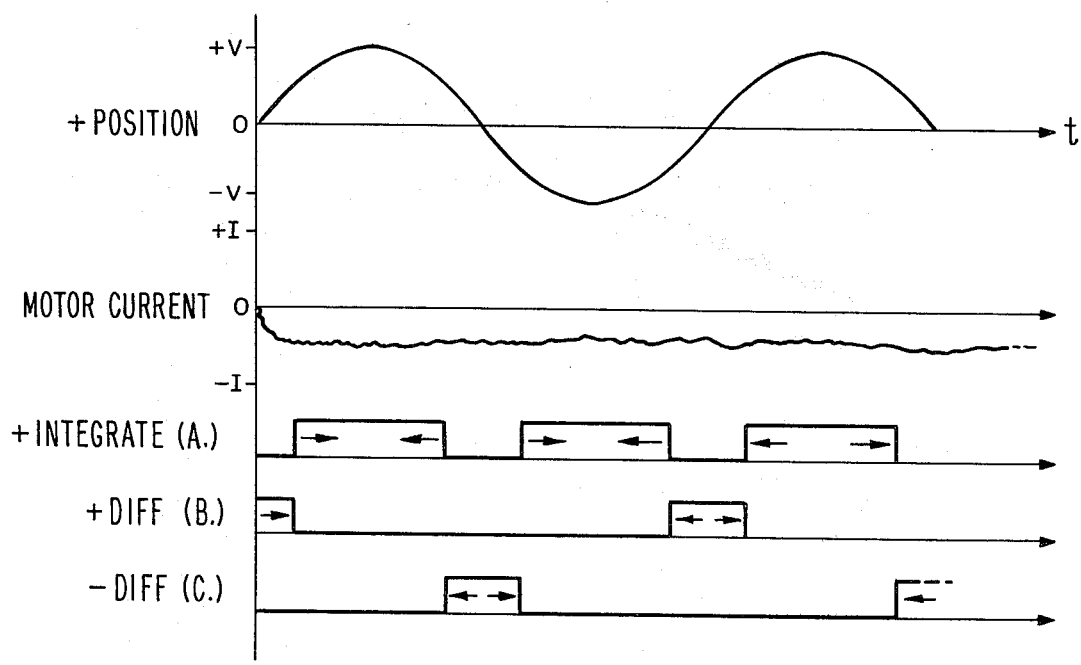
FIG. 9 shows comparable wave forms and timing diagrams during the final stage of the deceleration operation.

Finally, when the deceleration mode has continued long enough that the velocity signal has dropped to a predetermined low level, the system moves into the low velocity decelerate mode. This is the most critical portion of the seek since it sets the initial conditions for the track following the loop to be read or written on. If the bandwidth of the velocity servo were lowered, the reliability of the arrival of the head at the chosen track would be impaired. Therefore, it is important that the low velocity decelerate mode be entirely accurate. Nevertheless, the total speed requirements of the system still require that the system operate as quickly as possible, i.e. with a wide bandwidth; therefore, during the low velocity portion of the seek, the duty cycle of the differentiators is gradually increased so as to increase the accuracy of the arrival. This portion of the seek is relatively short in time, so that the exponentially growing sinusoid due to the resonance does not have time to increase to a point where the mechanical resonants are noticeable or dangerous. The duty cycle of the differentiators can be increased continuously or as a function of velocity or of remaining difference. FIG. 9 shows this graphically. The wave form is much as before. However, the motor current is below zero, indicating that the motor is being braked. Arrows are provided on the timing diagrams of the integrator and the differentiators to indicate how their duty cycle varies as velocity decreases. Thus, the integration is shown in FIG. 9 as taking up most of the period of operation, but as decreasing as the distance decreases so that the period of differentiation can increase, thus providing increasingly accurate position sensing. The increase in differentiator duty cycle will ordinarily be increased until it is equal to that in the acceleration mode or 50%.

Thus, there has been described a mechanical servo control system which prevents mechanical resonance from affecting the servo loop control because the mechanical resonant portions of the servo system are removed from the servo loop during periods when entirely accurate position control is not essential and sufficiently adequate information can be generated by an indication of the current drawn by the servo motor, which is indicative of the acceleration undergone by the servo system.

Finally, while this concept has been applied in the above description of the preferred embodiments to the velocity servo loop of the read/write head of a magnetic disk storage drive, it will be understood that it can be applied to any system in which the response of the resonant portion of the loop can be estimated by an electronic (non-resonant) estimator; therefore, the above description of the invention should be construed as exemplary only and not as a limitation on its scope, which is defined more properly by the following claims.

We claim:

1. Method for controlling a servo motor comprising the steps of:
    providing sensor means responsive to the position of apparatus moved by said servo motor and responsive to the current drawn by said motor and suited for providing first signals indicative of actual position of said apparatus;
    deriving a second signal proportional to the rate of change of relative position of said apparatus;
    intermittently adjusting starting conditions used in the derivation of said second signal in response to said first signal; and
    using said second signal for control of said servo motor;
    wherein said servo motor is operated in a first accelerative mode, a second steady velocity mode and a third decelerative mode and said adjustments to said starting conditions are not performed during said second steady velocity mode.

2. The method of claim 1 wherein said apparatus is a magnetic read/write head adapted to read and write data to and from magnetic disk storage media.

3. The method according to claim 2 wherein said first signal indicative of actual position is derived from position information permanently written on one of said magnetic disks.

4. The method of claim 1 wherein said second signal porportional to the rate of change of relative position of said apparatus is derived from the current drawn through said motor.

5. The method of claim 4 wherein the derivation of said second signal includes integration utilizing starting conditions derived from said first signal indicative of actual position of said apparatus.

6. In magnetic disk storage apparatus including means for controlling a servo motor operable in plural modes for moving magnetic read/write head means relative to a magnetic disk means, comprising a tachometer for deriving an indication of the velocity of said servo motor of the type in which a first periodic signal is used at intervals, varying as a function of the period of said signal, to update a second signal indicative of the instantaneous velocity of said motor, the improvement which comprises means for varying the intervals relative to said periods at which said second signal is updated by said first signal with respect to the mode of operation of said motor.

7. The apparatus of claim 6 wherein said magnetic disk means comprises a plurality of disks mounted on a single spindle for rotation.

8. The apparatus of claim 7 wherein said disk media comprises permanently recorded position information used to generate said first signal.

9. The apparatus of claim 6 wherein said servo motor is used in a first accelerative mode, a second steady velocity mode, a third decelerative mode and a fourth stopping mode and said second signal is updated by said first signal only during said first, third and fourth modes.

10. The apparatus according to claim 9 wherein said second signal is updated by said first signal at intervals determined by comparison of the amplitude of said first signal with a predetermined signal height.

11. The apparatus of claim 10 wherein said predetermined reference signal height is between about 5 and about 30% of the maximum amplitude of said first signal during said third decelerative mode.

12. The apparatus according to claim 9 wherein said second signal is updated by said first signal during said stopping mode at progressively varying intervals, wherein said intervals are controlled by comparator means for comparing the amplitude of said first signal with a progressively varying reference signal height.

13. The apparatus of claim 12 wherein said reference signal height is progressively varied between its level during said third mode and about 50% of the maximum amplitude of said first signal.

* * * * *